Figure 1:
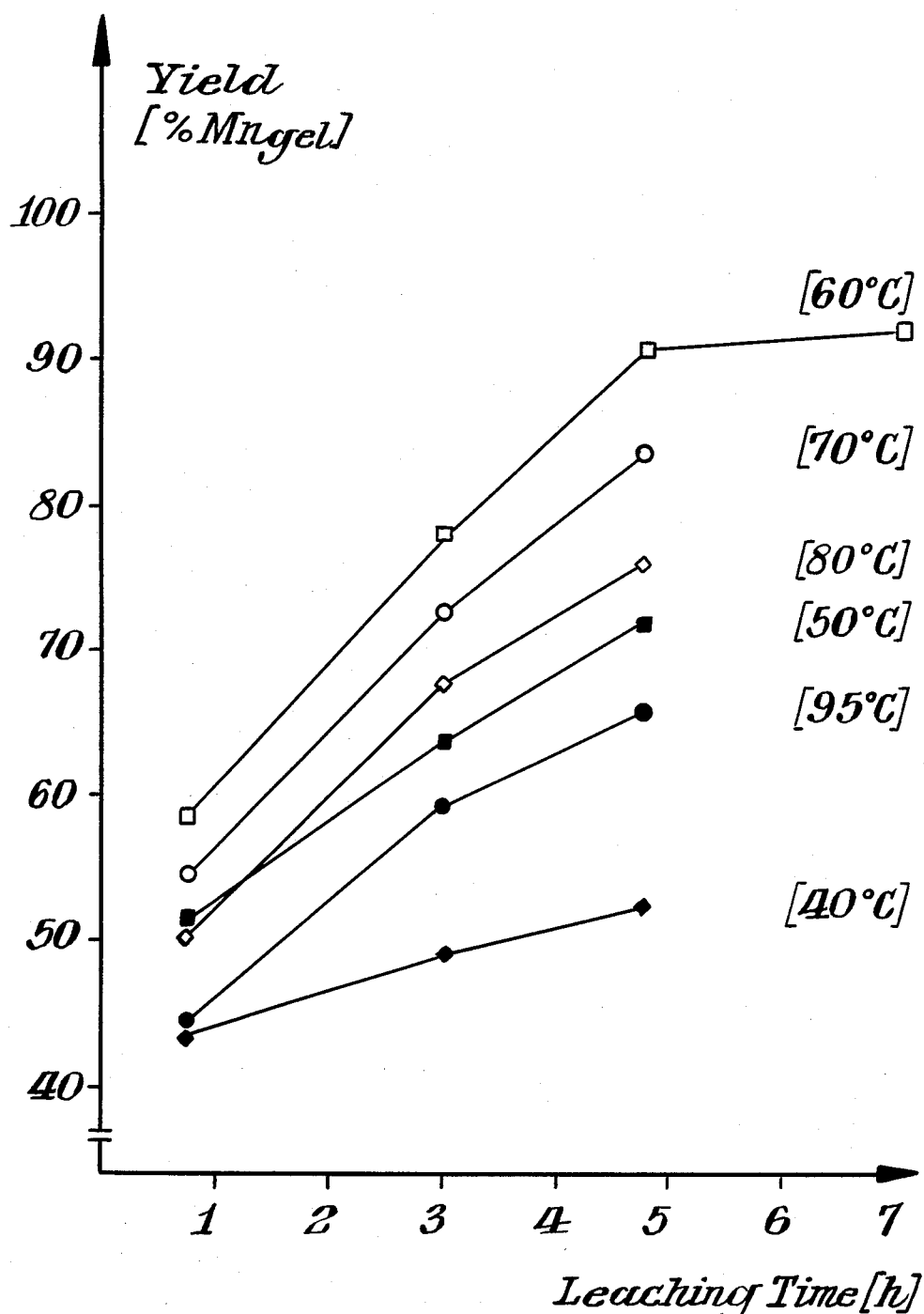

United States Patent [19]

Lehr et al.

[11] Patent Number: 4,600,565

[45] Date of Patent: Jul. 15, 1986

[54] PROCESS FOR MAKING MANGANESE (II) SALT SOLUTIONS CONTAINING AMMONIUM SALT

[75] Inventors: Klaus Lehr; Bernhard Hofmann, both of Hürth; Gero Heymer, Erftstadt, all of Fed. Rep. of Germany

[73] Assignee: Hoechst Aktiengesellschaft, Fed. Rep. of Germany

[21] Appl. No.: 708,299

[22] Filed: Mar. 5, 1985

[30] Foreign Application Priority Data

Mar. 5, 1984 [DE] Fed. Rep. of Germany ....... 3408031

[51] Int. Cl.$^4$ .............................................. C01G 45/00
[52] U.S. Cl. ......................................... 423/50; 423/49
[58] Field of Search ................. 423/49, 50, 51, 52

[56] References Cited

U.S. PATENT DOCUMENTS

| 1,889,021 | 11/1932 | Kobe ....................................... 423/50 |
| 1,947,457 | 2/1934 | Bradley ................................ 423/52 |
| 1,951,341 | 3/1934 | Bradley ................................ 423/52 |
| 2,343,293 | 3/1944 | Hannay et al. ......................... 423/50 |

FOREIGN PATENT DOCUMENTS 284098 1/1928 United Kingdom ................ 423/50

OTHER PUBLICATIONS

Hou, "Manufacture of Soda", Reinhold Pub. Corp., N.Y., 1942, pp. 225-234, (pp. 233 & 234 of Particular Interest).

Primary Examiner—H. T. Carter
Attorney, Agent, or Firm—Connolly and Hutz

[57] ABSTRACT

Manganese(II)salt solutions containing ammonium salt are made by subjecting a manganese-containing compound to processing treatment with an ammonium salt solution. A boiling temperature of 57°-68° C. is established in the suspension to be subjected to the processing treatment, by application of a vacuum. The ammonium salt solution used contains 0.5-2.5 mol/l diammonium sulfate or 1.0-5.0 mol/l ammonium nitrate.

10 Claims, 2 Drawing Figures

PROCESS FOR MAKING MANGANESE (II) SALT SOLUTIONS CONTAINING AMMONIUM SALT

The present invention relates to a process for making manganese(II)salt solutions containing ammonium salt by processing a manganese-containing compound with an ammonium salt solution.

Pure manganese salts are continuously gaining interest as intermediary products for use in the production of γ-manganese dioxide which is a raw material used for making batteries.

γ-manganese dioxide is separated electrolytically from an acid manganese(II)salt solution. Disadvantages of this process reside in the high capital investment and expensive current for electrolysis. A less expensive process for making γ-manganese dioxide comprises subjecting manganese carbonate to an oxidizing reaction operation. Manganese carbonate can be precipitated from a manganese(II)salt solution with the use of carbon dioxide and ammonia.

A method for processing reduced manganese ore with an ammonium sulfate solution for obtaining a manganese(II)salt solution has been described in U.S. Pat. No. 1,889,021. The ore is leached at the boiling point of the reaction mixture and expelled ammonia is used in a subsequent reaction stage together with carbon dioxide for precipitating manganese carbonate from the manganese(II)salt solution. The ammonium sulfate solution obtained after separation of the manganese carbonate is recycled into the leaching stage.

After the processing stage, a solution containing 60–120 g/l diammonium sulfate but merely 20 g/l $MnSO_4 = 7.3$ g/l Mn is obtained which is disadvantageous. This means that a quantity of diammonium sulfate solution relatively large as compared with the dissolved manganese is cycled, so that this method lacks commercial attractiveness.

U.S. Pat. No. 1,947,457 describes a leaching process for recovering manganese(II)salt solutions from reduced manganese ore, wherein the manganese ore is leached at increased or boiling temperature and ammonia is expelled during leaching by means of an oxygen-containing gas. The oxygen-containing gas permits existing iron compounds to be simultaneously oxidized and precipitated.

In order to facilitate expelling the $NH_3$, a special reactor which provides for a large surface of the leaching liquor at a low depth of liquor is used. The yield in this leaching process is 80% at a reaction temperature of 100° F. $\Delta$ 38° C. and a depth of liquor of 12 in $\Delta$ 30 cm, or 85% at 85° F. $\Delta$ 29° C. at a depth of liquor of 0.4 in $\Delta$ 1.25 cm, air being in each case bubbled through to reduce the concentration of $NH_3$ in the leaching liquor. The ammonium salt solution used for leaching contains 10% diammonium sulfate $\Delta$ 0.76 mol/l, and 10 parts diammonium sulfate per 1 part manganese(II)oxide contained in the ore are used for leaching.

As can be inferred from this, this so-called Bradley-Fitch process is commercially unattractive as regards the technique used for operating the processing reactor and the low quotient of $$\frac{\text{Mn (dissolved)}}{\text{diammonium sulfate used}}$$

as large quantities of ammonium salt solution are required to be circulated. The high proportion of inert gas (air) in the $NH_3$-gas expelled is also disadvantageous in the event of the $NH_3$ being worked up, say to $(NH_4)_2CO_3$, for precipitating manganese carbonate from the manganese(II)salt solution originating from the ore leaching.

U.S. Pat. No. 1,951,341 describes a process for leaching manganese ore with an ammonium salt solution at 100° C., wherein $NH_3$ is expelled from the leaching liquor by means of steam with heavy expenditure of energy. The manganese yield, based on the ore used, is not indicated but it is indicated that the conditions specified require the leaching operation to be effected in two consecutive partial steps. In addition to this, 10 kg ammonium sulfate solution of 10 weight % strength is used per 1 kg ore (193 g Mn). In this process, too, the quotient of $$\frac{\text{Mn (dissolved)}}{\text{diammonium sulfate used}}$$

is small and the resulting manganese(II)salt solution contains not more than 20 g/l manganese.

As can be inferred from a description of the Bradley-Fitch process carried out on a pilot scale (E. S. Leaver, Bureau of Mines Information Circular 6770 (1934), pages 167–192) with the use of ore containing 17% Mn, a manganese(II)salt solution containing 4% $MnSO_4 \triangleq$ 14.6 g/l manganese was obtained in the first leaching step in a yield of 60%, which was further treated (countercurrently) in the second leaching step to a concentration of 6% $MnSO_4 \triangleq$ 21.8 g/l manganese. Next, manganese was precipitated from this solution; it was obtained in a yield of only 50%, the balance being retained in the ammonium salt solution which was recycled to the ore processing stage. In this way, the dissolution equilibrium was affected to the detriment of the Mn-ore leaching. In addition to this, as a result of the high proportion of gangue in the ore it was either necessary to use large quantities of water and later to evaporate the water, or to accept heavy loss of manganese(II)salt and ammonium sulfate through moist filter cake. This is an uneconomic procedure.

All of the processes referred to hereinabove finally fail to describe the precipitation of such heavy metals as Cu, Co, Ni, and the like which are predominantly dissolved by the ammonium sulfate solution, in sulfide form.

The present invention now provides a process for making pure manganese(II)salt solutions containing ammonium salt from material containing manganese with the use of an ammonium salt solution, wherein the manganese(II)salt solutions of good filterability contaminated with minor proportions of magnesium, are obtained in high yields. More particularly, the invention provides for mother liquor containing dissolved diammonium sulfate and coming from a manganese carbonate precipitating stage to be used for leaching reduced manganese ore.

The present process for making manganese(II)salt solutions containing ammonium salt by processing a manganese-containing compound with an ammonium salt solution is characterized in that a boiling temperature of 57°–68° C. is established in the suspension to be leached, by the application of a vacuum. Particularly good results are obtained by establishing a boiling temperature of 59°–62° C. in the suspension to be leached, by the application of a vacuum. Preferred features of the present invention provide for the ammonium salt solution used for leaching to contain 0.5–2.5 mol/l, preferably 0.9–1.1 mol/l diammonium sulfate, or 1.0–5.0 mol/l, preferably 1.8–2.2 mol/l ammonium nitrate, and for the ammonium sulfate solution used for leaching to come from a manganese carbonate precipitating stage and to contain 0.7–1.5 mol/l diammonium sulfate or 1.4–3.0 mol/l ammonium nitrate.

The manganese-containing compounds used in the process of this invention should be selected from reduced high grade manganese ores containing more than 55% manganese(II)oxide. Heavy metals contained e.g. in the manganese ore and dissolved during leaching should conveniently be precipitated in sulfide form at the end of the leaching operation.

The present process can also be effected using an ammonium chloride solution which however means corrosiveness for steel-made structural elements.

The process of this invention compares favorably with prior art methods in that yields higher than 90%, based on the manganese(II)content of the reduced ore, are obtained at a leaching temperature of 57°–68° C., especially at 59°–62° C., and a leaching period of 3 hours. The suspension is well filterable as the gangue present in the ore remains granular and thus acts as a filter aid. At temperatures lower than 57° C., the viscosity of the manganese(II)salt solutions containing ammonium salt increases and renders filtration more difficult; at temperatures higher than 68° C., slimy matter commences separating and good filtration is rendered extremely difficult.

A further advantage resides in the fact that only minor magnesium impurities are contained in the manganese(II)salt solution at leaching temperatures of 57°–68° C. Magnesium compounds are not separable from a manganese(II)salt solution and they go forward into the final product on subjecting the manganese(II)-salt solution to work up into manganese carbonate.

The process of this invention carried out while respecting the parameters set forth herein produces a manganese sulfate solution containing ammoniun salt which meets the following specification, after separation of solid matter:

| | |
|---|---|
| $(NH_4)_2SO_4$ = 0.1–2.1 mol/l | (0.2–0.5 mol/l) |
| $MnSO_4$ = 0.4–2.4 mol/l | (0.7–1.0 mol/l) |
| Ca <300 mg/l | (<220 mg/l) |
| Mg <300 mg/l | (<220 mg/l) |
| Na <200 mg/l | (<20 mg/l) |
| K <200 mg/l | (<30 mg/l) |
| Fe <1.0 mg/l | (<0.5 mg/l) |
| Cu <0.1 mg/l | (<0.1 mg/l) |
| Co <1.0 mg/l | (<0.5 mg/l) |
| Ni <0.5 mg/l | (<0.3 mg/l) |

Indicated in brackets ( ) are the results obtained under the preferred leaching conditions.

Ore leached with the use of an ammonium nitrate solution is considerably more heavily contaminated with calcium salts. By the addition of sulfate, it is however possible to reduce the calcium contamination in the manganese salt solution.

The following examples illustrate the invention.

EXAMPLES 1–20

592 g reduced Imini ore was in each case processed using each time 10 liter of a 1 molar diammonium sulfate solution at a temperature between 40° and 100° C. over a period of 1–5 hours in an agitator-provided jacketed vessel. The Imini ore which had previously been reduced with hydrogen at increased temperature contained 78.5 wgt % MnO
7.1 wgt % $SiO_2$
1.2 wgt % $MnO_2$
0.7 wgt % $Fe_2O_3$.

By the application of a vacuum by means of a jet pump, the suspension to be processed was kept at the boil and steam-saturated ammonia was expelled. The evaporation heat was introduced by means of a warm water cycle into the agitator-provided vessel, through its jacket.

Specimens were taken from the agitator-provided vessel at 1 hour intervals and the quantity of manganese dissolved was determined analytically. At the end of the leaching operation, hydrogen sulfide gas was introduced for precipitating the heavy metals, the batch was filtered, and the composition of the manganese salt solution was determined analytically.

In working Example 9, the manganese(II)salt solution contained 32.7 g/l manganese.

The results obtained are indicated in the following Tables 1 and 2.

TABLE 1

Dependence of yield on leaching temperature and period

| Ex. No. | Reaction period (h) | Reaction temperature (°C.) | Yield % Mn dissolved |
|---|---|---|---|
| 1 | 1 | 40 | 43.2 |
| 2 | 3 | 40 | 49.5 |
| 3 | 5 | 40 | 52.2 |
| 4 | 1 | 50 | 51.1 |
| 5 | 3 | 50 | 63.6 |
| 6 | 5 | 50 | 71.9 |
| 7 | 1 | 60 | 58.5 |
| 8 | 3 | 60 | 78.0 |
| 9 | 5 | 60 | 90.9 |
| 10 | 7 | 60 | 91.9 |
| 11 | 10 | 60 | 92.7 |
| 12 | 1 | 70 | 54.3 |
| 13 | 3 | 70 | 72.6 |
| 14 | 5 | 70 | 83.5 |
| 15 | 1 | 80 | 50.1 |
| 16 | 3 | 80 | 67.6 |
| 17 | 5 | 80 | 76.0 |
| 18 | 1 | 95 | 44.4 |
| 19 | 3 | 95 | 59.2 |
| 20 | 5 | 95 | 65.7 |

TABLE 2

Analytical composition of filtered manganese salt solution

| | Impurities in [mg/l] | | | | | | |
|---|---|---|---|---|---|---|---|
| Ex. No. | Mg | Ca | Na | K | Fe | Cu | Co | Ni |
| 3 | 180 | 200 | 12 | 26 | 0.6 | <0.1 | 0.5 | 0.2 |
| 6 | 190 | 210 | 11 | 27 | 0.5 | <0.1 | 0.5 | 0.2 |
| 9 | 200 | 220 | 11 | 26 | 0.6 | <0.1 | 0.5 | 0.2 |
| 14 | 220 | 240 | 11 | 23 | 0.6 | <0.1 | 0.6 | 0.2 |
| 17 | 235 | 250 | 10 | 24 | 0.5 | <0.1 | 0.6 | 0.2 |
| 20 | 265 | 290 | 10 | 19 | 0.6 | <0.1 | 0.6 | 0.2 |

Figure 2:
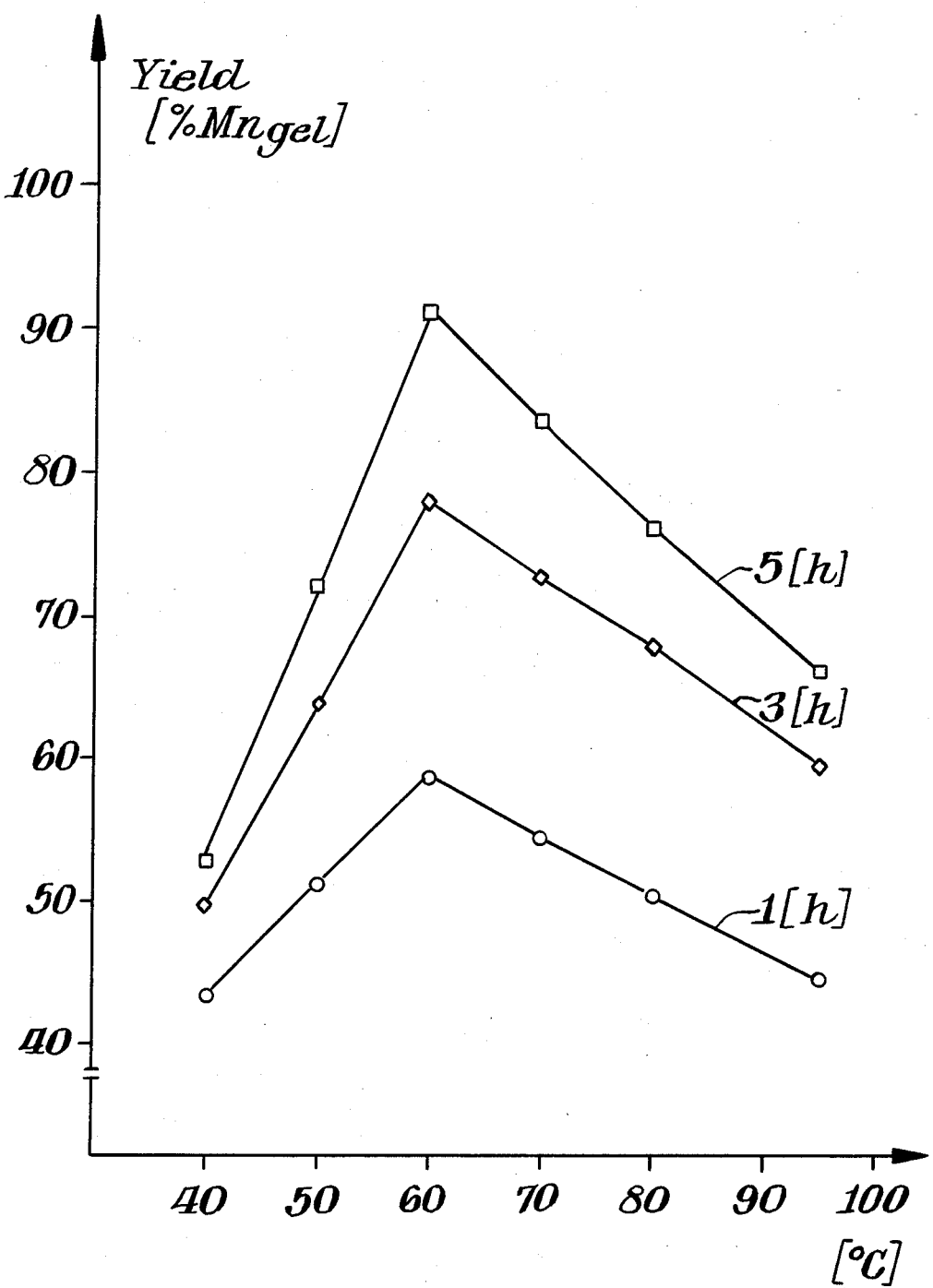

The accompanying FIGS. 1 and 2 form part of the invention; in FIG. 1, the yield of dissolved manganese is plotted against the leaching period; in FIG. 2, the yield of dissolved manganese is plotted against the leaching temperature.

EXAMPLE 21

592 g reduced Imini ore and 10 l ammonium salt solution were kept boiling at 60° C. over a period of 5 hours in the agitator-provided vessel under a pressure of 0.2 bar.

The ammonium salt solution came from a manganese carbonate precipitating stage and contained 1.08 mol/l diammonium sulfate at a pH of 8.0.

After a leaching period of 5 hours, the dissolved heavy metals were precipitated by introduction of hydrogen sulfide at a temperature of 60° C. and solid matter was filtered off. The yield of dissolved manganese was 91.8%.

The manganese salt solution was treated with an ammoniacal diammonium carbonate solution containing ammonium salt and manganese was precipitated in form of manganese carbonate at 60° C. and at a pH of 8.0. The filtrate obtained during the manganese carbonate precipitating stage was reused for leaching ore. 592 g reduced Imini ore was leached with 10 l of the ammonium salt solution filtered off, containing 1.1 mol/l diammonium sulfate. The yield of dissolved manganese was 92.0%. It was contaminated with 200 mg/l magnesium.

The term solution as used in the claims, description and working examples herein always means an aqueous solution.

We claim:

1. A process for making an ammonium salt-containing manganese(II)salt solution which comprises: leaching a reduced manganese ore containing more than 55 wgt % manganese(II)oxide with a solution containing 0.5 to 2.5 mol/l diammonium sulfate or with a solution containing 1.0 to 5.0 mol/l ammonium nitrate at a temperature of 57° to 68° C. under reduced pressure, the temperature of 57° to 68° C. which is the boiling temperature of the leaching liquor, being adjusted through reduced pressure.

2. A process as claimed in claim 1, wherein the ammonium salt solution contains 0.9–1.1 mol/l diammonium sulfate.

3. A process as claimed in claim 1, wherein the ammonium salt solution contains 1.8–2.2 mol/l ammonium nitrate.

4. A process as claimed in claim 1, wherein the boiling temperature of the leaching liquor is adjusted to 59°–62° C. through reduced pressure.

5. A process for making an ammonium salt-containing manganese(II)salt solution, which comprises:
leaching a reduced manganese ore, said manganese ore containing more than 55 weight-% manganese(II)oxide, with a dissolved ammonium salt-containing leaching liquor, wherein the ammonium salt is a sulfate or nitrate said leaching being carried out, with boiling of the leaching liquor, at a temperature of 57° to 68° C., the boiling of the leach liquor and the desired temperature range being obtained and controlled through application of reduced pressure, for a period of at least about one hour.

6. A process as claimed in claim 5 wherein the ammonium salt dissolved in the leaching liquor is diammonium sulfate or ammonium nitrate.

7. A process as claimed in claim 6 wherein the amount of diammonium sulfate in the leach liquor is 0.5–2.5 mol/l.

8. A process as claimed in claim 6 wherein the amount of ammonium nitrate in the leach liquor is 1.0 to 5.0 mol/l.

9. A process as claimed in claim 6, wherein the ammonium salt solution originates from a manganese carbonate precipitating stage.

10. A process as claimed in claim 5, wherein heavy metals dissolved during the leaching are precipitated in sulfide form at the end of the leaching operation.

* * * * *